Figure 1:
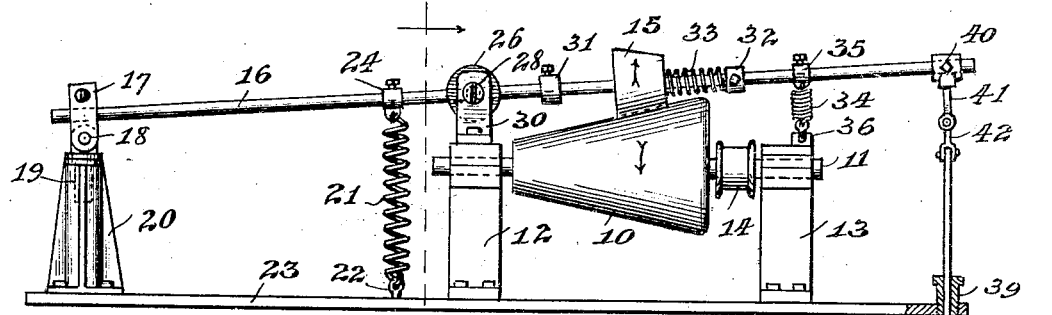

No. 890,748. PATENTED JUNE 16, 1908.
A. C. ALLAN.
GOVERNOR.
APPLICATION FILED OCT. 14, 1907.

Witnesses,
S. S. Mann
Walter M. Fuller

Inventor,
Allan C. Allan
By Offield Towle & Linthicum
Atty's

UNITED STATES PATENT OFFICE.

ALLAN CHURCH ALLAN, OF CHICAGO, ILLINOIS.

GOVERNOR.

No. 890,748.  Specification of Letters Patent.  Patented June 16, 1908.

Application filed October 14, 1907. Serial No. 397,317.

*To all whom it may concern:*

Be it known that I, ALLAN CHURCH ALLAN, a citizen of the United States, residing at Chicago, in the county of Cook and State of Illinois, have invented certain new and useful Improvements in Engine-Governors, of which the following is a specification.

My invention relates to engine or other governors, and has for its aim and object the production of a mechanism driven by the engine or machine to be governed or controlled and adapted to regulate the speed thereof. Sensitiveness is an essential element of devices of this character, and my improved construction has this feature to such an extent as to satisfactorily and reliably control and govern the speed of an engine and confine its variation of speed to an extremely small limit or margin.

The preferred embodiment of my invention has a comparatively large cone belted to or otherwise driven by the engine. This larger cone rotates a smaller reversely-arranged cone bearing on its surface, and rotatable and slidably mounted on a rod or shaft which permits the axis of the smaller cone to be shifted to one side or the other of the fixed axis of the larger cone, suitable adjustable stops being provided to limit this shifting of the rod or shaft. The mounting of this rod also permits it to swing away from or toward the axis of the larger cone, such movement of the rod controlling the opening and closing of the steam valve of the engine, the rod being connected to the stem of the valve by any suitable means. An adjustable spring is also connected to the rod, tending to pull the shaft or rod to one side of the axis of the larger cone. If the cones are rotated at a sufficient speed, the rod carrying the smaller cone will be moved by the latter to one side of the axis of the larger cone against one of the adjusting stops and in opposition to the controlling spring. When the rod is in this inclined position, the smaller cone travels along the same up the larger cone, its travel in this direction being controlled and limited by any suitable means. As the smaller cone ascends the larger one traveling longitudinally of the shaft or rod on which it is mounted, the latter is shifted more or less, which movement closes either fully or partially the throttle valve of the engine. If the speed decreases so that the force acting on the smaller cone, tending to shift the same and the rod on which it is mounted to one side, is decreased and overbalanced by the controlling spring, the latter pulls the rod and smaller cone over the center of the larger cone and against the other stop. This shifting of the traveling cone and its supporting rod causes the cone to travel down the larger cone, which movement lowers the rod or shaft, thereby opening the steam controlling valve, allowing a greater supply of steam to the engine resulting in an increase of speed. As soon as the speed becomes normal again, the force acting on the smaller cone is sufficient to push it and its rod to the other side of the axis of the larger cone against the action of the controlling spring, after which movement the smaller cone travels up the larger one, cutting off the supply of steam more or less. It will thus be apparent that the travel of the little cone up or down the larger one controls the opening and closing of the steam throttle valve of the engine, and that the upward or downward movement of the smaller cone on the larger one is determined by the position of the axis of the former, which position is controlled by the speed of the machine and the spring.

On the accompanying drawing I have illustrated one desirable embodiment of my invention and a slight modification in the construction, it being understood that like reference characters refer to the same parts throughout the various views.

Figure 3:
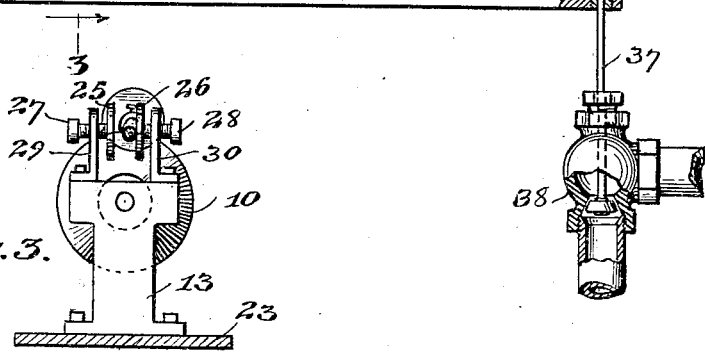
Figure 2:
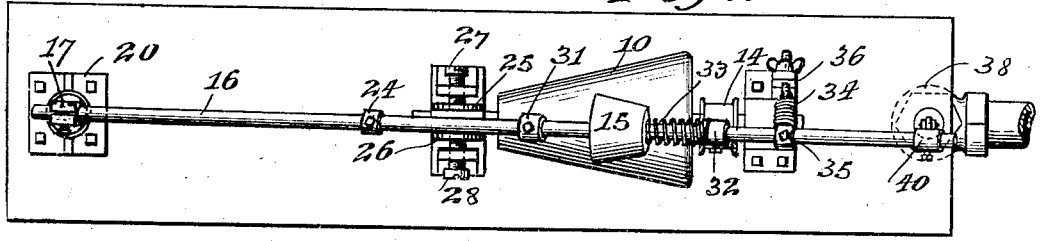
Figure 4:
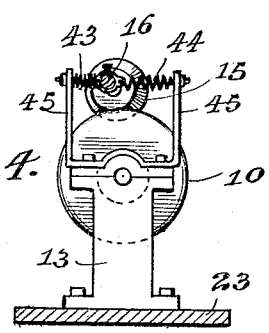

On the drawing—Figure 1 is a side elevation of my improved engine governor showing the throttle valve of the engine partially in section; Fig. 2 is a plan view of the device shown in Fig. 1; Fig. 3 is a vertical section on line 3—3 of Fig. 1 as viewed in the direction indicated by the arrows; and Fig. 4 illustrates a construction having two controlling springs instead of one.

A comparatively large cone 10 is fixed to a shaft 11 rotatable in bearings on the top of a pair of standards 12 and 13. A small pulley 14 is also fixed to this shaft and is connected to some rotating part of the engine by a belt, not illustrated. A smaller reversely-arranged cone 15 contacts with the surface of the larger cone 10 and is rotated thereby, the cone 15 being not only rotatable but also slidable on a comparatively long rod or shaft 16, the left-hand end of which is held in a clamp 17 hinged at 18 to the top end of a cylindrical stud 19 fitting in and rotatable in an upright standard or support 20. It will be noticed that because of this mounting of the rod 16 the latter may swing either sidewise or up and down. The two cones are held in firm contact by means of a downwardly pulling spring 21 fastened at 22 to the base 23 of the device and secured at its upper end to a collar 24 on the rod. Lateral shifting or movement of the rod is controlled and regulated by means of a pair of disks or stops 25 and 26 located on opposite sides of the rod and mounted on adjustable screws 27 and 28 engaging and passing through screw-threaded apertures in the upper ends of brackets 29 and 30 bolted or otherwise secured to the top of standard 12. In order to limit and restrict the travel of the smaller cone down the surface of the larger cone, a stop collar 31 is fastened on rod 16. To prevent the cone 15 from traveling off of the top end of the larger cone, I supply the rod 16 with another collar 32 between which and the cone 15 is interposed a compression spring 33. An adjustable controlling or governing coil spring 34 is fastened to the rod or shaft at 35, and at its lower end it is adjustably fastened to the top end of standard 13 at 36, the spring 34 acting or tending to pull the rod 16 over against the limiting stop or disk 25. The stem 37 of the throttling or steam supply controlling valve 38 is vertically reciprocatory in a bearing 39 and has its upper end connected to the rod 16 at the point 40 by means of a pair of links 41 and 42 which are hinged at right angles to permit the rod 16 to turn in any direction without causing a binding of the valve stem in its bearing.

When the rod 16 is swung to one side of the axis of the larger cone 10 and rests against the stop 26, and the cones are rotated in the directions indicated by the arrows in Fig. 1, the smaller cone will travel up the larger cone, it being apparent that a component of the force transmitted to the smaller cone by the larger one tends to push the same lengthwise the rod 16 toward collar 32. It will also be observed that such travel of the cone lifts the rod 16 so as to close valve 38 more or less. If the cones were rotated in the opposite direction, cone 15 instead of traveling up the larger one would move down. When the shaft 16 is shifted to the other side of the axis of cone 10 and rests against the stop 25, and the cones are rotated in the direction indicated by the arrows, then the smaller cone travels down its companion, and it might be noted that if the direction of rotation of the cones was reversed, the cone would travel up instead of down. If the shaft 16 is directly over the axis of cone 10 then the smaller cone will travel neither up nor down, because there is no component of any force tending to move it in either direction.

The operation of this engine governor is substantially as follows: When the engine is stopped and is about to be started, steam is admitted to its cylinder, valve 38 being then open to its full extent since the traveling cone 15 is in its lowermost position against stop 31. When the speed attained is sufficient so that the force acting on cone 15 to shift it and the shaft 16 over the center against stop 26 in opposition to the action of spring 34, this shifting of the shaft and cone occurs. Owing to this change of position of the shaft and cone, the latter will now travel up the surface of the larger cone, and in so doing will lift rod 16, thereby closing to a greater or less extent valve 38. This upward travel of the cone is cushioned and limited by the coil spring 33 surrounding the rod. If the speed decreases, the force acting on cone 15 which has previously held the rod 16 over against stop 26 also decreases, and upon such decrease the spring 34 is enabled to pull the cone and rod over the center of the larger cone against stop 25. Consequently, cone 15 travels down the larger cone and in so doing opens the throttle valve to allow an increased supply of steam to the engine, under which new supply of steam the speed will increase, and as soon as it reaches the normal the cone 15 and rod 16 will be shifted to the position indicated in Fig. 2, whereupon the smaller cone will travel up the larger one, closing the valve more or less. From this description it will be apparent that the force acting on the cone 15 derived from the larger cone 10 tends to hold the rod 16 in one position, and that if this force, which is dependent upon the speed, decreases, the spring 34 overbalances the force acting on cone 15 and pulls the rod over against stop 25, which action causes an increase of steam supply to the engine. It is to be understood that the cone 15 need not travel all the distance down to the stop 31 before the shaft 16 is shifted again over against the stop 26, since this shifting will occur as soon as the speed increases to the normal, the parts being adjusted to accomplish this result.

Although I have described this governor as employed in connection with a throttle valve, it will readily be understood that in place of this valve any of the other ordinary and usual means of controlling the engine may be employed and operated by the movement of the rod 16.

It is desirable to be able to run some engines in opposite directions, and where my improved governor is to be employed with such an engine I use two springs 43 and 44 in place of the single spring 34 to act in opposite directions on the rod 16, the outer ends of these springs being adjustably connected to brackets 45 on the top of standard 13. These two oppositely acting springs are so arranged that when the rod 16 is directly above the axis of the larger cone neither is under tension, but as soon as the rod is shifted to one side or the other, one of the springs will become active, tending to pull the rod over against its stop.

My invention is not limited and restricted to the precise structural details shown and described, since the minor features and elements of my structure may be varied considerably without departure from the substance and spirit of my invention. Although I have described and illustrated my governor as applicable for use with an engine, it will be readily understood that its use is not limited to this particular art, since it can be as readily employed as a water wheel governor or on any other machine, such as a bundle carrier on a threshing machine, etc., whose speed requires control and regulation.

I claim:

1. In a governor, the combination of a revoluble member adapted to be rotated by the engine or other machine to be governed or controlled, a companion rotary member in contact with the surface of and rotated by said revoluble member, a mounting for said companion rotary member permitting its axis to be shifted to one side or the other of the axis of said revoluble member and permitting said companion member to travel lengthwise said revoluble member, and means connected to the controlling mechanism of the engine or other device and governed by the movement of said companion rotary member, substantially as described.

2. In a governor, the combination of a revoluble member adapted to be rotated by the engine or other machine to be governed or controlled, a companion rotary member in contact with the surface of and rotated by said revoluble member, a mounting for said companion rotary member permitting its axis to be shifted to one side or the other of the axis of said revoluble member and permitting said companion member to travel lengthwise said revoluble member, means acting on said companion rotary member to shift its axis to one side of the axis of said revoluble member, and means connected to the controlling mechanism of the engine or other device and governed by the movement of said companion rotary member, substantially as described.

3. In a governor, the combination of a revoluble member adapted to be rotated by the engine or other machine to be governed or controlled, a companion rotary member in contact with the surface of and rotated by said revoluble member, a mounting for said companion rotary member permitting its axis to be shifted to one side or the other of the axis of said revoluble member and permitting said companion member to travel lengthwise said revoluble member, stops to limit the shifting of said companion rotary member on opposite sides of the axis of said revoluble member, means tending to shift the axis of said companion rotary member to one side of the axis of said revoluble member, and means connected to the controlling mechanism of the engine or other device and governed by the movement of said companion rotary member, substantially as described.

4. In a governor, the combination of a revoluble member adapted to be rotated by the engine or other machine to be governed or controlled, a companion rotary member in contact with the surface of and rotated by said revoluble member, one of said members being a cone, a mounting for said companion rotary member permitting its axis to be shifted to one side or the other of the axis of said revoluble member and permitting said companion member to travel lengthwise said revoluble member, and means connected to the controlling mechanism of the engine or other device and governed by the movement of said companion rotary member, substantially as described.

5. In a governor, the combination of a revoluble member adapted to be rotated by the engine or other machine to be governed or controlled, a companion rotary member in contact with the surface of and rotated by said revoluble member, one of said members being a cone, a mounting for said companion rotary member permitting its axis to be shifted to one side or the other of the axis of said revoluble member and permitting its companion member to travel lengthwise said revoluble member, means acting on said companion rotary member to shift its axis to one side of the axis of said revoluble member, and means connected to the controlling mechanism of the engine or other device and governed by the movement of said companion rotary member, substantially as described.

6. In a governor, the combination of a first cone adapted to be rotated by the engine or other machine to be governed or controlled, a second cone reversely-arranged with respect to, in contact with, and rotated by said first cone, a mounting for said second cone permitting its axis to be shifted to one side or the other of the axis of said first cone and permitting said second cone to travel lengthwise said first cone, and means connected to the controlling mechanism of the engine or other device and governed by the movement of said second cone, substantially as described.

7. In a governor, the combination of a first cone adapted to be rotated by the engine or other machine to be governed or controlled a second cone reversely-arranged with respect to, in contact with, and rotated by said first cone, a mounting for said second cone permitting its axis to be shifted to one side or the other of the axis of said first cone and permitting said second cone to travel lengthwise said first cone, stops to limit the shifting of said second cone to one side or the other of the axis of said first cone, means acting on said second cone and tending to shift the axis thereof to one side of said first cone, and means connected to the controlling mechanism of the engine or other device and governed by the movement of said second cone, substantially as described.

8. In a governor, the combination of a first cone adapted to be rotated by the engine or other machine to be governed or controlled, a second cone reversely-arranged with respect to, in contact with, and rotated by said first cone, a rod or shaft on which said second cone is rotatable and longitudinally movable, a mounting for said shaft permitting its axis to be shifted to one side or the other of and toward and from the axis of said first cone, means acting on said rod tending to shift the axis of the same to one side of the axis of said first cone, and means connecting said rod to the controlling mechanism of the engine or other machine, substantially as described.

9. In a governor, the combination of a first cone adapted to be rotated by the engine or other machine to be governed or controlled, a second cone reversely-arranged with respect to, in contact with, and rotated by said first cone, a rod or shaft on which said second cone is rotatable and longitudinally movable, a mounting for said rod or shaft permitting its axis to be shifted to one side or the other of and toward and from the axis of said first cone, means acting on said rod tending to shift the axis of the same to one side of the axis of said first cone, stops to limit shifting of said rod or shaft, stops to limit the travel of said second cone on said rod, and means connecting said rod to the controlling mechanism of the engine or other machine, substantially as described.

ALLAN CHURCH ALLAN.

Witnesses:
GEORGE L. PECK,
GEORGE A. TURNER